(12) United States Patent
Hrubesh et al.

(10) Patent No.: US 6,709,600 B2
(45) Date of Patent: Mar. 23, 2004

(54) METHOD FOR REMOVING ORGANIC LIQUIDS FROM AQUEOUS SOLUTIONS AND MIXTURES

(75) Inventors: Lawrence W. Hrubesh, Pleasanton, CA (US); Paul R. Coronado, Livermore, CA (US); Jerome P. Dow, Pleasanton, CA (US)

(73) Assignee: The Regents of the University of California, Oakland, CA (US)

( * ) Notice: Subject to any disclaimer, the term of this patent is extended or adjusted under 35 U.S.C. 154(b) by 35 days.

(21) Appl. No.: 09/957,854

(22) Filed: Sep. 21, 2001

(65) Prior Publication Data

US 2003/0060520 A1 Mar. 27, 2003

(51) Int. Cl.$^7$ .................. B01D 17/022; B01D 15/00; C02F 1/28
(52) U.S. Cl. ................ 210/691; 516/136; 203/10
(58) Field of Search ............. 516/136; 210/691, 210/664; 203/10

(56) References Cited

U.S. PATENT DOCUMENTS

| | | | |
|---|---|---|---|
| 3,467,581 A | * 9/1969 | Privette et al. ............. | 516/79 |
| 3,728,208 A | * 4/1973 | Whittington et al. ........ | 210/691 |
| 5,037,557 A | * 8/1991 | Warrenchak et al. ....... | 210/691 |
| 5,137,639 A | * 8/1992 | Guzik et al. ............... | 210/691 |
| 5,275,796 A | 1/1994 | Tillotson et al. ........... | 423/338 |
| 5,382,364 A | * 1/1995 | Bowser et al. .............. | 210/640 |
| 5,409,683 A | 4/1995 | Tillotson et al. ........... | 423/338 |
| 5,508,341 A | 4/1996 | Mayer et al. ............... | 524/596 |
| 6,005,012 A | 12/1999 | Hrubesh et al. ............. | 521/53 |

FOREIGN PATENT DOCUMENTS

| | | | |
|---|---|---|---|
| EP | 0441512 B1 | 4/1994 | ......... B01J/20/26 |
| EP | 0669152 A1 | 10/1994 | ......... B01D/17/022 |
| WO | WO 9722652 | * 6/1997 | |

OTHER PUBLICATIONS

Ralph K. Iler, "The Colloid Chemistry of Silica and Sil;icates". (Cornell University Press, Ithica, NY, 1955) Jul. 1955, pp. 127, 254–257.*
Chemical Abstract CA 120:199493, 1993, month unknown.
Chemical Abstract CA 82: 46072, 1973, month unknown.
World Patent Index JP 11138017, 19990806, week 199931.
World Patent Index WO 9847594, 19990217, week 199849.
World Patent Index RU 2064825C, 19990424, week 199717.
World Patent Index DE 19516253A, 19961205, week 199649.
World Patent Index JP O4271834A, 19931116, week 199245.
L. W. Hrubesh et al, Journal of Non–Crystalline Solids, 285 328–332, (Jun. 2001).

* cited by examiner

Primary Examiner—Daniel S. Metzmaier
(74) Attorney, Agent, or Firm—Ann M. Lee; Alan H. Thompson; Eddie E. Scott

(57) ABSTRACT

A method for removing organic liquids from aqueous solutions and mixtures. The method employs any porous material preferably in granular form and having small pores and a large specific surface area, that is hydrophobic so that liquid water does not readily wet its surface. In this method, organics, especially organic solvents that mix with and are more volatile than water, are separated from aqueous solution by preferentially evaporating across the liquid/solid boundary formed at the surfaces of the hydrophobic porous materials. Also, organic solvents that are immiscible with water, preferentially wet the surfaces of the hydrophobic material and are drawn within the porous materials by capillary action.

10 Claims, No Drawings

METHOD FOR REMOVING ORGANIC LIQUIDS FROM AQUEOUS SOLUTIONS AND MIXTURES

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to the removal of organics from water, particularly to the removal of organic liquids from aqueous solutions and mixtures employing a porous material, and more particularly to the use of porous materials in a granular form and having small pores and a large specific area that is hydrophobic so that liquid water does not readily wet its surface.

A common approach to remove organics from water and water solutions is by filtration. In order to enhance the absorption capacity, highly porous materials like activated carbon granules are selected for the filter medium. Such materials have huge internal surfaces for adsorbed molecules to reside. These materials separate the organics from aqueous solutions by diffusion of the organic molecules into the pores and consequent adsorption onto the surfaces. However, since liquid water also fills the available pores and thus competes with the organics for the available surface sites, the maximum possible separations are not obtained. A preferred approach is to inhibit the liquid water from entering the pores, thereby allowing the vapors to enter the porous materials. In this case, the more volatile constituents of the solution preferentially enter the porous material and reside at most of the available adsorption sites. Hence, separations are enhanced for the organic solvents which are generally more volatile than water under normal conditions of temperature and pressure. Furthermore, organics that do not readily mix with water, and thus form separate phases in mixtures with water, generally have surface energies which are less than that of water. This property of organic liquids allows them to easily wet the surfaces of the porous material and be preferentially drawn into the pores by capillarity, leaving the water behind. Very large separation factors are possible for this case.

The key property of the porous material to inhibit wetting by liquid water is hydrophobicity. This property requires that the surface energy of the solid be greater than the surface energy of the liquid water, so that the liquid does not spread out to cover the available surface. Such a property is inherent for many polymers, the best examples of which are polythylene, and polytetrafluoroethylne (Teflon). Other materials such as carbons and inorganic oxides have low surface energies and their surfaces have to be chemically modified to raise their surface energies above that for water.

The present invention involves a method for removing organic liquids from aqueous solutions and mixtures by the use of semi-solid gel materials or aerogels. Aerogels have small pores and a large specific surface area and can be fabricated so that liquid water does not readily wet the surface, a hydrophobic aerogel. The invention has been demonstrated using silica aerogels which have either been chemically treated or produced directly to be hydrophobic. However, organic or functionalized carbon aerogels may also be used. The aerogel material may be in either granular or powdered form. Separation capacities of porous materials (hydrophobic aerogels) greatly exceed those for non-hydrophobic porous materials.

SUMMARY OF THE INVENTION

It is an object of the present invention to provide a method for removing organic liquids from aqueous solutions and mixtures.

It is a further object of the invention is to provide a hydrophobic aerogel.

A further object of the invention is to provide an aerogel which has been treated chemically or produced directly to be hydrophobic, whereby liquid water does not readily wet the surface of the aerogel.

Another object of the invention is to enable organics, especially organic solutions that mix with and are more volatile than water, to be separated from an aqueous solution by preferentially evaporating across the liquid/solid boundary formed on the surfaces of the hydrophobic aerogel material.

Another object of the invention is to enable separation of organic solvents that are immiscible with water and which preferentially wet the surfaces of a hydrophobic aerogel and are drawn within the aerogel by capillary action.

Another object of the invention is to significantly increase the separation capacities of hydrophobic porous materials over those for non-hydrophobic materials because the pores do not preferentially fill with water before separation can occur.

Other objects and advantages will become apparent from the following description. This invention is a method for removing organic liquids from aqueous solutions and mixtures. While the invention may employ any porous material or a semi-solid gel material, it is preferred that the material is in granular form and has small pores and a large specific surface area, that is hydrophobic so that liquid water does not readily wet its surface. The preferred material may be composed of hydrophobic inorganic or organic aerogels. The separation capacities of hydrophobic aerogels greatly exceed those for non-hydrophobic porous materials because the pores do not preferentially fill with water before separation can occur. Applications for the hydrophobic aerogel separators include water or other fluid purification, extraction of microscopic particles from body fluids, toxic waste cleanup, bandages and sterile absorbers.

DETAILED DESCRIPTION OF THE INVENTION

This invention is a method for removing organic liquids from aqueous solutions and mixtures. The invention involves a semi-solid gel material or a solid material, such as an aerogel, consisting of a solid network of connected, generally spheroidal shaped sub-micrometer sized particles, in which the interstitial spaces between the particles define continuous pores through the material. Such pores have an average size scale which is generally less than 1 micromedia and which can be changed over a selected range by proper choice of chemicals and process conditions. Solution chemistry, also known as sol-gel processing, is used to make the semi-solid or solid material using selected chemicals and process conditions. The surfaces within the material can be chemically modified, made hydrophobic, either during the solution chemical synthesis, or after the structure is formed, including also, after the gel is dried (i.e., an aerogel or xerogel), when that state is desired. The surfaces are chemically modified to provide variations in surface energies and/or particles relative to the carrier fluid.

The invention employs any porous material, preferably in granular form and having small pores and a large specific surface area, that is hydrophobic so that liquid water does not readily wet its surface. In this invention, organics, especially organic solvents that mix with and are more volatile than water, are separated from aqueous solution by preferentially evaporating across the liquid/solid boundary formed at the surfaces of the hydrophobic porous materials. Also, organic solvents that are immiscible with water, preferentially wet the surfaces of the hydrophobic material and are drawn within the porous material by capillary action. Separation capacities of porous materials for this method greatly exceed those for non-hydrophobic porous materials because the pores do not preferentially fill with water before separations can occur.

While the method of this invention may be utilized with any porous semi-solid or solid material having small pores, a large specific surface area, and which is hydrophobic so that liquid water does not readily wet its surface, the preferred porus material comprises an inorganic or organic aerogel, with the experimental data set forth below being from highly hydrophobic silica aerogels.

One embodiment of the invention is an aerogel made of silicon-dioxide (silica), with surfaces that are chemically modified to repel liquid water. This material will selectively draw (wick) fluids which are immiscible with water when it is placed in contact with such a mixture. Nanosized particles entrained by the immiscible fluid are also carried into the material and trapped therein. Almost the entire volume of the aerogel can be filled by the fluid because the density of the aerogel may be small (e.g., <0.02 g/cc). The surface-modified aerogel can also absorb other solvents which are in mixtures with water. In this case, the solvent enters the dried aerogel as a vapor and condenses within it when the concentration is sufficiently high.

Another embodiment is a water filled gel in the form of a thin membrane which can sustain a hydrostatic pressure difference across it, between two different carrier fluids. Nanosized particles in one of the carrier fluids can flow through the membrane under the influence of the pressure difference; and they can be deposited in the flow of the other carrier fluid. The extremely small pores ensure that only nanoparticles will traverse the membrane, and thus the material provides for extraction of microparticles from body fluids, as well as for purification of water and other fluids.

Aerogels may be produced directly or chemically treated to be hydrophobic (having, as pointed out above, the property of repelling liquid water), and the following more specific examples sets forth additional hydrophobic silica aerogels.

The hydrophobic property is achieved by formulating the aerogel using fluorine containing molecules either directly by addition in the sol-gel process, or by treating a standard dried aerogel using the vapor of fluorine containing molecules. While hydrophobic silica aerogels can be made from the pure fluorine containing molecules, the optical properties of the aerogel are usually negatively affected. Highly hydrophobic silica aerogels are achieved by adding less than 30% by weight of certain fluorine containing alkoxides to the silicon alkoxide during the gel synthesis; highly transparent aerogels result from this process.

Hydrophobic aerogels are synthesized using fluorine containing compounds such as perfluoroalkyl-akoxy silanes, with trifluoropropyl-trimethoxy-silane (TFTMOS) being preferred. A necessary requirement is that the fluorine containing compound has at least one carbon-metal bond per molecule.

EXAMPLE 1

A hydrophobic silica aerogel is synthesized directly from TFTMOS by mixing 85 gms of TFTMOS and 64 gms of methyl alcohol with a solution of 64 gms of alcohol and 72 gms of water and using 40 micrograms of a catalyst such as ammonium hydroxide. The mixture is stirred for 15 minutes and poured into molds. Gelation occurs within 60 minutes.

EXAMPLE 2

Silica aerogels with less concentration of the TFTMOS are also very hydrophobic. Examples are mixtures with 10, 20, and 30% by weight of TFTMOS in silica gels. The 10% synthesis is done by mixing 0.5 gms of TMTMOS with 30 gms of TMOS and 72 gms of alcohol, 17.5 gms of water and adding 12.5 milligrams of a catalyst such as ammonium hydroxide. The mixture is stirred for 2 minutes and poured into molds. Gelation occurs in 120 minutes. The 30% synthesis is done by mixing 75 gms of TMTMOS with 150 gms of TMOS and 360 gms of alcohol, 88.7 gms of water and adding 62.5 milligrams of a catalyst such as ammonium hydroxide. The mixture is stirred for 2 minutes and poured into molds. Gelation occurs in 120 minutes.

After the gels are formed they are dried either using an autoclave to extract the solvent fluid (alcohol) above its critical temperature and pressure (about 4 hours), or they are slowly dried by evaporation (1 day-4 weeks, depending on the size of the aerogel) at normal temperature and pressure. Dried aerogels may also be treated by exposing them to vapors of the fluorine compounds to make them hydrophobic.

The hydrophobic nature of the aerogels is determined by measuring the angle made by a water droplet on a surface of the aerogel. The surface is hydrophobic if the droplet makes an angle with the surface, between 90° and 180°; the larger the contact angle, the larger the repelling force at the surface of the aerogel. All of the aerogels tested have contact angles of 90° and greater up to 150°, indicating a very high degree of hydrophobicity.

The invention has been demonstrated using silica aerogels, such as the examples described above, which have either been chemically treated or produced directly to be hydrophobic. The aerogels were in either granular or powdered form when tested but the material may be of a semi-solid gel. The degree of hydrophobic nature of the aerogel material is determined quantitatively using a sessile water droplet method; the angle of the droplet relative to a flat surface of the aerogel is measured. A very hydrophobic material will result in an angle >90° by this method. All the hydrophobia aerogels tested gave an angle >90°. Adsorption isotherms were measured for four different organic liquids (ethanol, toluene, cyclobenzene, and trichloroethylene) in water mixtures, each representing different cases of miscibility with water. The concentrations of the solvents in solution were measured by chromatography before and after the solution was passed through a recorded weight of silica aerogel in a column. Plots were made of the concentration of solvent remaining in solution in milligrams per liter versus the weight of solvent adsorbed per gram of aerogel used. These data were then used to determine the Freundlich adsorption parameters which were then used to compare capacities with other materials. The adsorption capacities for the four solvents listed are compared with published capacities for granulated activated carbon Table 1. The aerogel capacity exceeds the carbon material by large factors for all of the solvents tested.

TABLE 1

Comparison of Adsorption Capacities of Hydrophobic Silica
Aerogel & Granulated Activated Carbon

| | Adsorption Capacity (gm/gm) | |
|---|---|---|
| Solvent | Hydrophobic Silica Aerogel | Granulated Activated Carbon |
| Toluene | 0.833 | 0.026 |
| Cyclohexane | 0.458 | 0.011 |
| Trichloroethylene | 11.89 | 0.091 |
| Ethanol | 1.94 | 0.028 |

It has thus been shown that the present invention provides an effective method for removing organic liquids from aqueous solutions and mixtures. It has been shown that hydrophobic aerogels have significantly higher adsorption capacities than granulated activated carbon. By this invention, organics that mix with water can be separated from the water, and organics that are immiscible with water can be separated from the water utilizing hydrophobic aerogels. In addition, methyl functional groups may be used to produce hydrophobic aerogels.

While particular examples, data, etc. have been set forth to exemplify and teach the principles of the invention, such are not intended to be limiting. Modifications and changes may become apparent to those skilled in the art, and it is intended that the invention be limited only by the scope of the appended claims.

What is claimed is:

1. In a method for removing organic liquids from aqueous solutions, the improvement comprising: utilizing to separate organic liquids from aqueous solutions a porous material composed of an aerogel having small pores and large surface area, and which is hydrophobic, and forming the hydrophobic aerogel by using fluorine containing molecules in a sol-gel process.

2. The improvement of claim 1, additionally including forming the porous material in a granular form.

3. The improvement of claim 1, wherein separation of the organic liquids that mix with the aqueous solution is carried out by evaporating across a liquid/solid boundary formed at the surfaces of the hydrophobic porous material.

4. The improvement of claim 1, wherein separation of organic liquids that are immiscible with the aqueous solution is carried out by wetting the surfaces of the hydrophobic porous material and are drawn within the porous material by capillary action.

5. The improvement of claim 1, wherein said aerogel is a silica aerogel.

6. The improvement of claim 1, wherein said aerogel is composed of one of the group of granular form and powder form.

7. The improvement of claim 1, wherein the aerogel is composed of methyl function groups.

8. The improvement of claim 1, additionally including forming the porous material as a membrane for insertion between two fluids.

9. In a method for removing organic liquids from aqueous solutions, the improvement comprising: utilizing to separate organic liquids from aqueous solutions a porous material composed of an aerogel having small pores and large surface area, and which is hydrophobic, the hydrophobic aerogel being formed by using fluorine containing molecules and treating a dried aerogel using a the vapor of the flourine containing molecules.

10. A method for removing organic liquids from aqueous solutions and mixtures using a hydrophobic aerogel whereby liquid water does not readily wet its surface, wherein organics that mix with and are more volatile than water are separated from the aqueous solution by preferentially evaporating across the liquid/solid boundary formed by surfaces of the hydrophobic aerogel, and wherein organic solvents that are immesicible with water, preferentially wet the surfaces of the hydrophobic aerogel and are drawn within the aerogel by capillary action, the hydrophobic aerogel being formed from a silica aerogel being made hydrophobic by using fluorine containing molecules in formulating the aerogel or treating a dried aerogel using a vapor of fluorine containing molecules.

\* \* \* \* \*